United States Patent Office 3,286,802
Patented Nov. 22, 1966

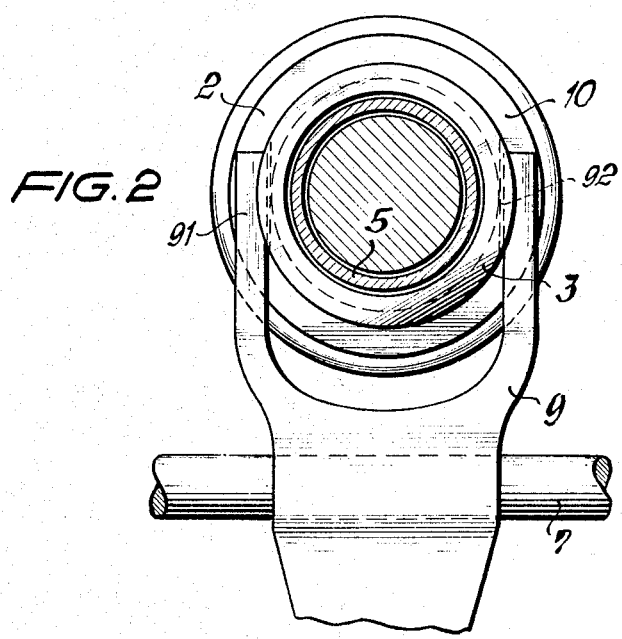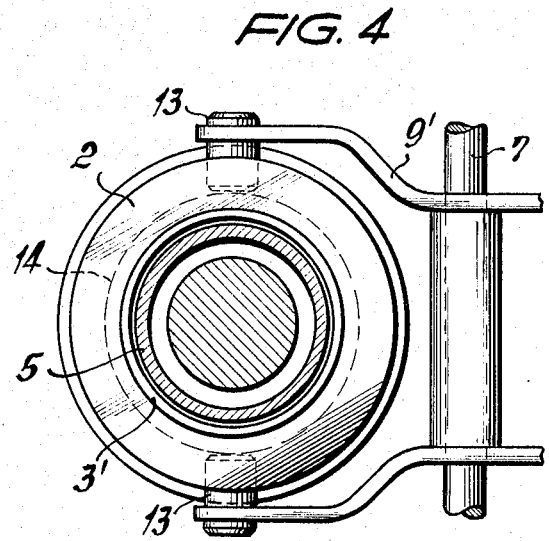

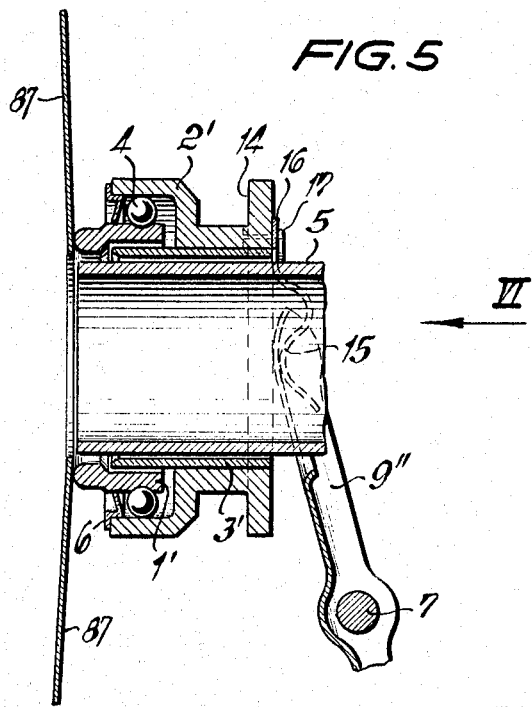
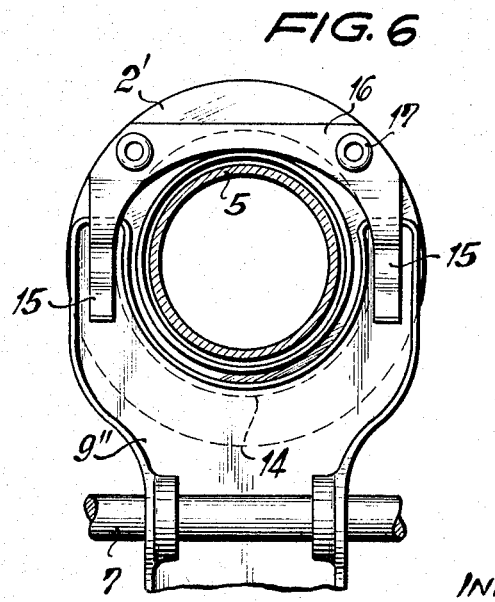

1

3,286,802
CLUTCH RELEASE BEARING MECHANISM
Kurt Fädler and Richard Binder, Schweinfurt am Main, Germany, assignors to Fichtel & Sachs A.G., Schweinfurt am Main, Germany, a corporation of Germany
Filed Nov. 25, 1964, Ser. No. 413,887
Claims priority, application Germany, Dec. 14, 1963, F 41,540
4 Claims. (Cl. 192—98)

This invention relates to friction clutches, and particularly to a release mechanism for friction clutches and to the cooperation of the release mechanism with other elements of the clutch.

It is known to provide automotive friction clutches with a release bearing arranged for axial movement into a position in which a rotatable portion of the bearing axially displaces release members mounted on the input member of the clutch, and thereby releases the clutch. The known clutch release bearings are assembled from a relatively large number of individual elements which are relatively complex and which require great care during assembly if low friction between the rotatable and the stationary portions of the bearing is to be maintained.

A primary object of the invention is the provision of a clutch release bearing which is readily assembled from a small number of component parts in precise spatial relationship of the parts.

It is not practical to employ materials of construction in the known clutch release bearings which would provide the most desirable surfaces for contact with the release members of the clutch and with the actuating member which shifts the bearing toward and away from the release members. The stresses in known clutch release bearing elements whose surfaces enage cooperating other elements of the clutch assembly are frequently so high that considerations of mechanical strength must prevail over considerations of favorable friction properties. Relatively rapid wear is therefore unavoidable.

It is another object of this invention to provide a clutch release mechanism so constructed that materials of favorable frictional properties may be employed, and wear of critically dimensioned surfaces is minimized.

A further object is the provision of a clutch release bearing employing anti-friction bearing members in rolling contact with the bearing races in which the relative position of the bearing faces of the outer and inner bearing races is precisely maintained for quiet operation of the bearing and for low wear.

With these and other objects in view, the invention, in one of its aspects, provides a clutch release bearing in which abutment means are integral with the inner race member and project beyond the outer race member for direct contact with a release member mounted on the input member of the clutch. In another aspect, the invention provides an outer race member a portion of which projects axially in the opposite direction beyond the inner race member and conformingly engages a sleeve. The latter is slidably mounted on the supporting structure for movement of the bearing toward and away from engagement with the release member on the input member of the clutch.

Other features and many of the attendant advantages of this invention will be readily appreciated as the same becomes better understood by reference to the following detailed description of preferred embodiments when considered in connection with the accompanying drawings in which:

FIG. 1 shows an automotive friction clutch of the helical pressure spring disk type equipped with a release bearing mechanism of the invention in axial section;

2

FIG. 2 illustrates the release bearing mechanism of FIG. 1 in rear elevation, as viewed in the direction of the arrow II in FIG. 1;

FIG. 4 shows the release bearing mechanism of FIG. 3 in a rear elevational view taken in the direction of the arrow IV in FIG. 3;

FIG. 5 is a fragmentary, axially sectional view of the clutch of FIG. 3 equipped with yet another release bearing mechanism of the invention; and FIG. 6 is a view of the release bearing mechanism of FIG. 5 taken in the direction of the arrow VI.

Figure 1:
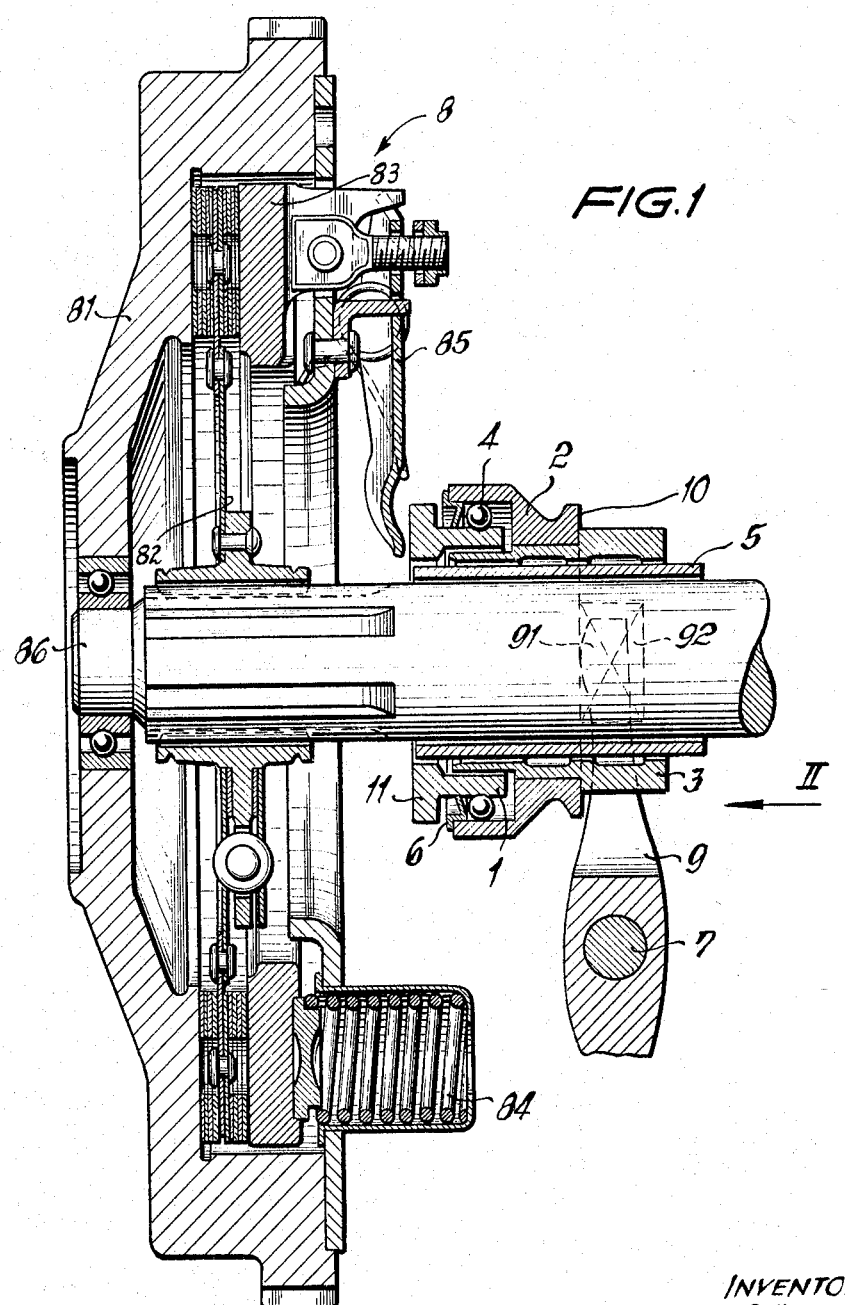

Referring now to the drawing in detail, and initially to FIG. 1, there is shown a conventional automotive clutch 8 whose input member is a flywheel 81. The output member of the clutch is a friction disk 82 which is held in frictional axial engagement with the flywheel 81 by an annular pressure plate 83 biased by helical pressure springs 84 arranged about the clutch axis, only one spring being shown in the drawing for the sake of clarity. The pressure plate 83 can be lifted from the disk 82 by pivoting movement of release levers 85 on the flywheel 81 in respective axial planes, whereby the clutch is disengaged, as is well known. Only one lever 85 is illustrated in FIG. 1.

The disk 82 is axially movable on the clutch shaft 86 which is coaxially journaled in the flywheel 81, but the disk 82 is secured against rotation relative to the shaft 86 by interengaging splines and axial grooves. The clutch housing and associated support structure which do not rotate with the flywheel 81 when the clutch is in the illustrated engaged position have been omitted from the showing of FIG. 1 except as will be noted hereinafter. The clutch shaft 86 connects the disk 82 with a variable speed transmission, not shown.

The clutch release mechanism with which this invention is particularly concerned includes an improved clutch release bearing having an inner annular race 1 and an outer annular race 2 which receive bearing balls 4 between their coaxial bearing faces. The balls transmit axial thrust between the races and are held in circumferentially spaced relationship by a cage or separator (not shown), as is conventional. The two bearing races are made of hardened steel. The outer bearing race 2 is secured by press fit to a sleeve 3 of light aluminum alloy coaxially movable on a tubular support member 5 which is an element of the stationary clutch housing assembly, not fully illustrated.

The outer axially extending face of the sleeve 3 is of stopped cylindrical shape, and the three cylindrical face portions of the sleeve vary in diameter from a minimum nearest the disk 82 to a maximum farthest away from the disk 82 in the direction of the clutch axis. The annular radial face of the sleeve 3 which connects the largest cylindrical face portion and that of intermediate diameter abuttingly engages a corresponding radial end face 10 of the outer race 2.

The latter has an internal face which is of approximately stepped cylindrical shape. The smaller one of the two internal face portions is in contact with the intermediate face portion of the sleeve 3, and the other face portion of the outer race 2 which has a larger internal diameter is in rolling contact with the balls 4. An annular sealing skirt 6 is attached to the outer race 2 to close the gap between the two races at its axial end nearer the clutch disk 82, and to prevent escape of lubricant from the bearing.

A flange 11 integral with the inner race 1 axially projects beyond the outer race 2 for engagement with the clutch release levers 85 when the clutch release bearing moves toward the disk 82 from the illustrated position.

Movement of the release bearing is actuated by a fork 9 pivotally mounted on a pin 7 which is another element of the aforementioned clutch housing assembly. As also seen in FIG. 2, the arms 91 of the fork 9 engage the radial end face 10 of the outer race 2 in corresponding circumferential recesses 92 of the sleeve 3.

Movement of the fork 9 on the pin 7 in a counterclockwise direction causes the flange 11 of the inner race 1 to engage the free ends of the levers 85, and thereby releases the clutch. The clutch release fork 9 transmits motion in a conventional manner, not further illustrated, from a clutch pedal under the driver's control to the clutch release bearing. When the pressure on the clutch pedal is released, the work 9 and the release bearing return to the illustrated position under the urging of a conventional pull-back spring, not shown, which is mounted on the clutch housing and may be fastened to the fork or directly attached to the outer race 2.

The sleeve 3 is not subjected to significant stresses during the operation of the clutch release mechanism because of the direct abutting engagement between the fork 9 and the radial end face 10 of the outer bearing race 2 in the recesses 92. Not only light and relatively soft aluminum alloys have been found satisfactory structural materials for the sleeve 3, but even such lighter and weaker materials as thermoplastic synthetic resin compositions. Molded plastic release bearing sleeves are entirely practical in the clutch release mechanism of the invention.

It will be appreciated that both races 1 and 2 stand still when the clutch is engaged, and that the inner race 1 rotates with the flywheel 81 when the clutch 8 is released. Because of the relatively small moment of inertia of the inner race 1, the cooperating surfaces of the levers 85 and of the flange 11 are subjected to frictional wear at a low rate only. The relatively low circumferential speed of the rotating inner race is beneficial in reducing lubricant losses from the bearing due to centrifugal forces. The release bearing of the invention shown in FIGS. 1 and 2 consists of only three elements other than the bearing balls which can be assembled in a very simple manner and without any risk of distorting the race surfaces. The bearing therefore operates smoothly and without undue noise.

The two bearing races 1, 2 are of simple shape and can readily be mass-produced from steel and hardened to close tolerances. Their cooperation with the fork 9 and the levers 85 causes but minimal wear to the hardened surfaces. Even when dimensioned to be very light, the bearing races of the invention have a long useful life. The use of plastics or of non-ferrous light metals as materials of construction for the sleeve 3 reduces friction between the sleeve and the supporting tube 5 which is most conveniently made of steel.

The advantages pointed out with reference to the clutch release bearing illustrated in FIGS. 1 and 2 are available to other embodiments of the invention, as will presently become apparent, and are not limited to any specific type of clutch.

Figure 3:
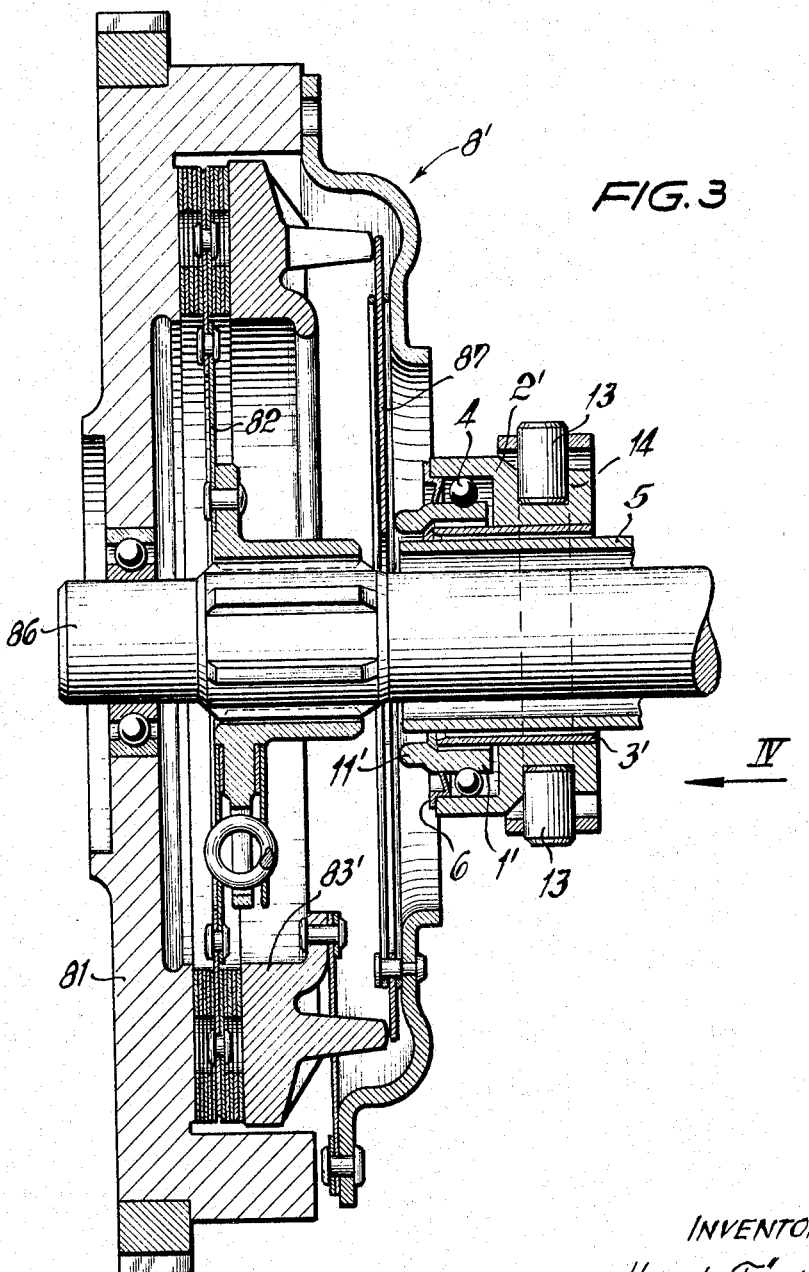
FIG. 3 shows an automotive diaphragm spring type clutch equipped with a modified release bearing mechanism of the invention in axially sectional view.

The clutch 8' illustrated in FIG. 3 is provided with a radially slotted diaphragm spring 87 which normally urges the friction disk 82 of the clutch into engagement with the flywheel 81 by means of a pressure plate 83'. The friction disk is mounted on the clutch shaft 86 in the same manner as described with reference to FIG. 1.

The modified clutch release bearing of the invention shown in FIG. 3 is axially movable on a tubular support member 5 coaxial with the shaft 86. A smooth tubular sleeve 3' of uniform cross section and made of soft aluminum alloy carries an outer bearing race 2' of hardened steel which is secured on the sleeve by a press fit. The inner face of the race 2' has two cylindrical portions of different diameter. The smaller portion engages the sleeve 3' and the larger portion is in rolling contact with the bearing balls 4.

The outer race 2' has an external annular groove 14 in which studs 13 are received. As better seen in FIG. 4, the studs 13 are mounted on the free arm ends of a release fork 9' which is pivoted on a pin 7. Pivoting movement of the fork 9' shifts the clutch release bearing to the left, as viewed in FIG. 3.

The inner bearing race 1' has a portion 11' which axially projects beyond the outer race 2' and has the shape of a hollow cylinder with a rounded circular edge. The edge abuttingly engages the central portions of the several sectors into which the spring 87 is divided by its radial slots. The resulting deformation of the spring relaxes the spring pressure on the pressure plate 83' and releases the clutch. A clutch pedal and a pull-back spring, not shown in the drawing, actuate the movements of the fork 9' as described hereinabove.

FIG. 5 shows only the central portion of a diaphragm spring 87 of a clutch which is also otherwise identical with the clutch 8' shown in FIG. 3. The clutch release bearing which cooperates with the spring 87 consists essentially of outer and inner bearing races 2', 1', bearing balls 4 retained between the races, and a sleeve 3' which slidably secures the bearing to a supporting tube 5, and is substantially identical with the corresponding structure shown in FIG. 3.

Axial movement of the clutch release bearing on the support 5 is actuated by a fork 9" which is pivotally connected to the stationary support structure of the clutch by a pin 7. The fork 9" is an approximately channel-shaped sheet metal stamping. Its two arms are movably fastened to the outer bearing race 2' in abutting engagement by two corresponding clips 15 which are integral portions of a leaf spring 16 and are best seen in FIG. 6. The spring is fastened to the outer bearing race 2' by two rivets 17 which extend from the radial end face of the race carrying the spring 16 into the annular groove 14 of the outer bearing race 2'.

This invention is not limited to the types of clutches specifically disclosed and other clutch mechanisms having movable output members may be substituted for the automotive clutches chosen for the purpose of the disclosure.

Obviously, many other modifications and variations of the present invention are possible in the light of the above teachings. It is therefore to be understood that, within the scope of the appended claims, the invention may be practiced otherwise than as specifically decscribed.

What we claim is:

1. A clutch release mechanism comprising, in combination:
   (a) a support;
   (b) a sleeve member having an axis and being axially slidably mounted on said support;
   (c) a unitary outer race member having an inner cylindrical bearing face and another inner face about said axis;
   (d) an inner race member having an outer bearing face spaced radially inwardly of and opposite said inner face, said bearing faces being coaxial;
   (e) a plurality of bearing members interposed between said race members in simultaneous rolling contact with said bearing faces;
   (f) abutment means integral with said inner race member and projecting beyond said outer race member in one axial direction;
      (1) said other inner face of said outer race member projecting beyond said inner race member in the other axial direction,
      (2) the dimensions of said other face transverse of said axis being substantially smaller than the corresponding dimensions of said inner bearing face,
      (3) said other inner face of said outer race member being secured to said sleeve member in contact therewith; and
   (g) actuating means for actuating axial movement of said race members relative to said support;

(1) said actuating means including a motion transmitting member movably mounted on said support,
(2) said outer race member having an abutment face abuttingly engaging said motion transmitting member,
(3) said inner bearing face, said other face, and said abutment face of said outer race member being integral elements of the unitary outer race member.

2. A clutch release mechanism comprising, in combination:
(a) a support defining an axis;
(b) a sleeve member axially slidable on said support;
(c) two unitary bearing race members;
(1) respective first axial portions of said bearing race members being axially coextensive and having respective coaxial, radially spaced, opposite bearing faces of circular cross section about said axis,
(2) respective second axial portions of said bearing race members extending from said first portions in opposite axial directions,
(3) the second axial portion of one of said bearing race members having an additional face about said axis fixedly engaging said sleeve member,
(4) the second axial portion of the other bearing member and said one bearing member having respective exposed abutment faces transverse of said axis and directed in said opposite axial directions respectively;

(d) a plurality of bearing members radially interposed between said bearing faces in simultaneous rolling contact with said faces; and
(e) actuating means engaging the abutment face of said one bearing member for axially moving said bearing race members, said sleeve member, and said bearing members.

3. A mechanism as set forth in claim 2, wherein said bearing race members are of a material substantially harder than the material of said sleeve member.

4. A mechanism as set forth in claim 2, wherein said abutment face of said other bearing race member is on said second axial portion thereof, said abutment faces are annular, and the bearing face and said additional face of said one bearing race member being inner faces, the dimensions of the bearing face of said one bearing race member transverse of said axis being substantially greater than the corresponding dimensions of said additional face.

References Cited by the Examiner

UNITED STATES PATENTS

| | | | |
|---|---|---|---|
| 1,966,146 | 7/1934 | Stanley | 308—233 |
| 1,978,658 | 10/1934 | Wemp | 192—68 X |
| 2,485,214 | 10/1948 | Peterson et al. | 192—68 |
| 2,773,576 | 12/1956 | Stenger | 192—68 |

FOREIGN PATENTS 523,593    7/1940    Great Britain.

DAVID J. WILLIAMOWSKY, *Primary Examiner.*

BENJAMIN W. WYCHE III, *Examiner.*